Patented June 26, 1923.

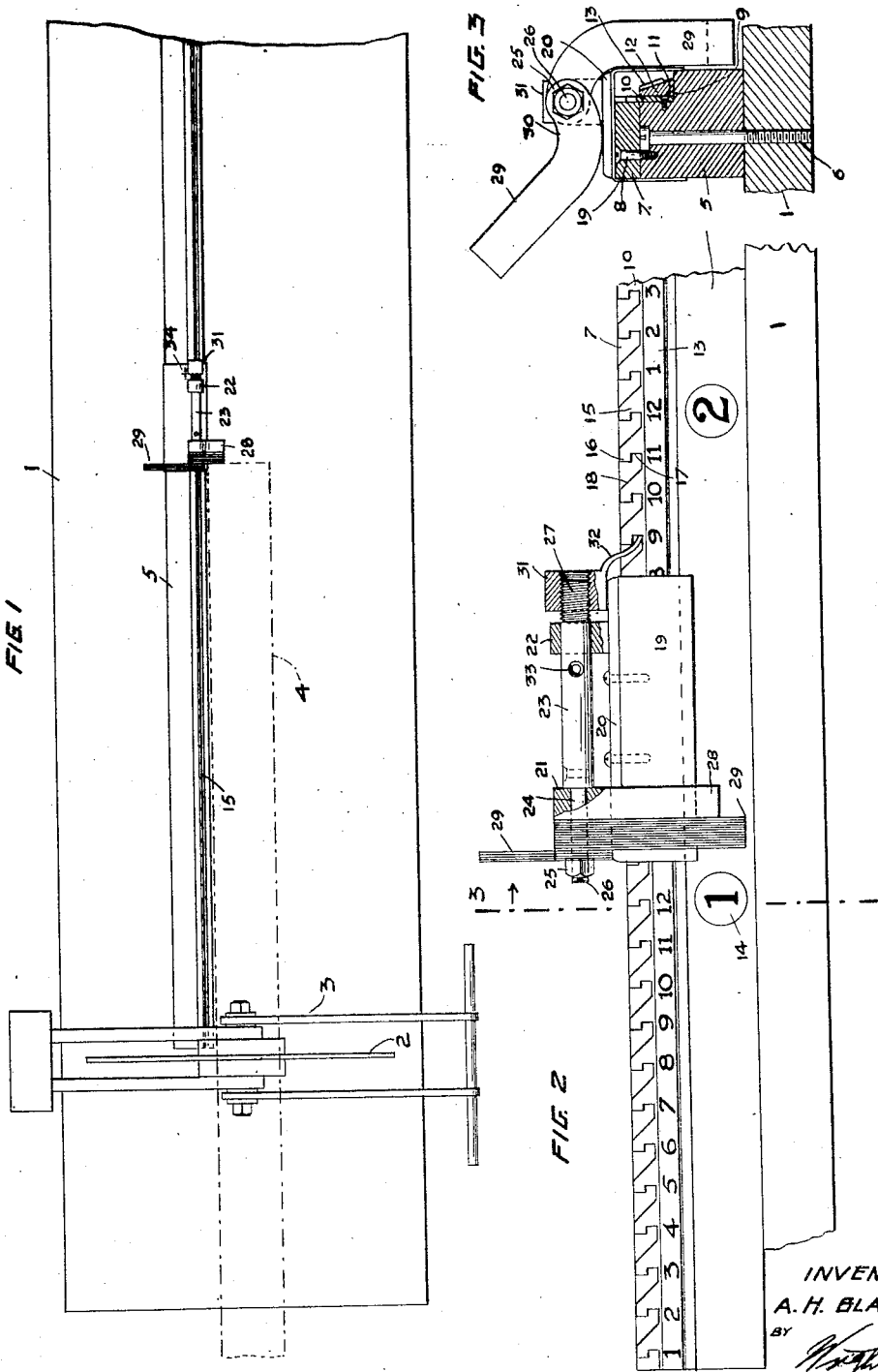

1,459,873

UNITED STATES PATENT OFFICE.

ALLEN H. BLACKBURN, OF HAYWARD, CALIFORNIA.

SAW GAUGE.

Application filed February 8, 1922. Serial No. 535,062.

*To all whom it may concern:*

Be it known that I, ALLEN H. BLACKBURN, a citizen of the United States, residing at Hayward, in the county of Alameda and State of California, have invented new and useful Improvements in Saw Gauges, of which the following is a specification.

This invention relates to improvements in saw gauges and has particular reference to a gauge of this type which will provide for quickly and accurately sawing boards and other pieces in predetermined measurements.

The primary object of the invention is to provide a saw gauge of the character described which is simple in construction, is capable of being quickly, easily and accurately adjusted and which will provide for accurately and expeditiously sawing material in various measurements.

Another object of the invention is to provide a gauge of the character described having novel means for measuring in fractions of an inch.

Another object of the invention is to provide novel means for holding the adjusting member in adjusted position such that it will not be subject to accidental displacement or derangement.

A further object of the invention is to provide in a device of the character described simple and effective means for quickly and accurately adjusting the gauge to compensate for differences in measurement due to the varying thicknesses of saws.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 represents a top plan view of the invention showing it as it would appear when in use in connection with a cross-cut saw.

Fig. 2 represents a fragmentary side elevation of the invention, parts being shown in section.

Fig. 3 represents a sectional view taken on line 3—3 of Fig. 2.

Referring to the present embodiment of the invention as illustrated in the accompanying drawings, 1 designates a saw table or bench, 2 the saw and 3 means for supporting the saw so that the latter may be moved into and out of position, a piece of material to be sawed being shown as at 4, in dotted lines in Fig. 1.

The gauge comprises a long wooden bar 5, which is substantially rectangular in cross section and is secured upon the table 1 by screws 6. A finishing strip 7 is secured by screws 8 to the upper side of the bar 5 and conceals the screws 6. The bar 5 is mounted upon the table 1 so as to extend at right angles to the saw and may be as long as desired, depending upon the character of the saw apparatus. One face of the bar 5 is recessed as at 9 and upon the vertical wall of said recessed portion there is secured an upright elongated metal plate or strip 10, which may be formed of strap metal or the like, said plate being held in place by the usual fastenings 11. Mounted upon the outer face of the strip or plate 10 is a bevelled wooden strip 12 upon the outer face of which a graduated plate or strip 13 is mounted, said plate or strip 13 being graduated in inches. Opposite every twelve inch point on the strip 12, the bar 5 is graduated in feet, as at 14. The upper edges of the members 12 and 13 terminate short of the upper edge of the plate 10. A series of spaced teeth or projections 15 are formed along the upper edge of the plate 10 and these teeth are cut away upon certain edges so as to provide overhanging portions 16 and vertical edges 17. The members 15 are so arranged that the space between the vertical edges 17 equal one inch, the opposite edges of the members 15 being bevelled or inclined as at 18 for a purpose which will later be more fully described.

The gauge member comprises a channeled or inverted U-shaped, preferably sheet metal, body member 19 adapted to fit over the bar 5 and embrace opposite sides thereof, as shown in Figs. 2 and 3. Mounted upon the upper side of the body member 19 is a plate 20 having upstanding ears 21 and 22. An adjusting screw 23 is mounted in said ears 21 and 22 and is provided with a reduced end portion 24 extending thru the ear 21 and having a nut 25 turned upon its threaded extremity 26. The other end of the screw extends thru and beyond the ear 22 and is provided with screw threads 27.

Formed integral with the ear 21 and extending downwardly along one side of the body member 19 is a stop member 28, the front face of which extends at right angles to the side of the body member and is located at a point spaced inwardly from the adjacent end of said body member. As a means providing for measuring in fractions of an inch there are provided a plurality of thin measuring members or plates 29, each of which is equal in thickness to a fraction of an inch, say, for example, a sixteenth of an inch. If the members 29 are to be one-sixteenth of an inch thick, there will be sixteen of such members mounted upon the reduced portion 24 of the screw 23. Each member 29 is provided with an angularly disposed upper end 30 pivoted upon the reduced portion 24 of the screw 23. Each member 29 is provided with an angularly disposed upper end 30 pivoted upon the reduced portion 24 in such manner that the remaining portion may extend downwardly in front of the stop 28. As shown in Figs. 2 and 3, four of the measuring members are in raised position so that the board or piece of lumber to be measured and sawed will engage at one end the fifth member 29.

To provide for holding the adjusting means in a main adjusted position and permit of slight movement of said means to compensate for different thicknesses of the saws, there is provided an internally screw threaded member 31 in the form of a nut into which the screw threaded end 27 is turned. This member 31 is provided with a downwardly and rearwardly extending detent 32 formed integral therewith and adapted to extend between the teeth 15 so that its outer end will engage the vertical edge 17 of one of said teeth and an overhanging portion 16, will engage the upper side of said detent to hold the same in place. The beveled edges 18 provide for the ready insertion of the detent between the teeth. The screw 23 is provided with openings 33 adapted to receive a suitable tool by means of which the screw may be turned in either direction so as to move the member 10 bodily in either direction whereby compensation for the thickness of the saw in measuring may be provided for.

Operation.

The gauge of this invention is particularly adapted for measuring in lengths. When it is desired to saw boards or strips of lumber in lengths, the body member 19 with the adjusting means thereon entirely removed from the bar 5, is placed in a predetermined position upon the bar, say for example, five inches from the saw end of said bar. To position the measuring device the detent 32 is placed between certain of the teeth and the member 19 is then forced down over the bar as shown in Figs. 2 and 3. As shown in Fig. 2, the length of the cut pieces is to be thirteen and four-sixteenth inches. This position is provided by placing the detent between the teeth 15 designated 8 and 9, lying between the first and second foot designations. This will dispose the member 19 in such position that the members 29, if all are extended downwardly so that the front face of the foremost member 29 will be in line with, or opposite, the one foot one inch designation, on the gauge. The operator then moves four of the members 29 into up position, as shown, and places the material to be cut so that one end abuts the foremost member 29, the fifth one, and by manipulating the saw in the usual manner the piece will be cut in lengths of thirteen and four-sixteenth inches. With the member 19 thus set in position it is possible to vary the cut from thirteen to fourteen inches in fractions of one-sixteenth of an inch or otherwise, depending upon the thickness of the members 29. When all the members 29 are raised or are in up position, the front face of the stop member 28 will provide an abutment, spaced exactly fourteen inches from the saw, as shown in Fig. 2.

To provide for changing the position of the body member 19 while the detent is disposed between any two of the teeth, so as to compensate for differences in measurement occuring due to differences in thickness of saws, the operator by turning the screw 23 may move the member 19 and its cooperating elements towards or away from the saw. When the screw 23 is turned in one direction the member 19 will move relative thereto towards the saw, due to the engagement of the detent 32 against one of the teeth. The opposite movement of the screw will move the member 19 and cooperating parts away from the saw. If desired, the face of the plate 20 adjacent the member 31 may be graduated as at 34 so as to provide for a quick and accurate compensating adjustment.

With reference to the foregoing description and accompanying drawings, it is seen that I have provided a simple, inexpensive, quickly and easily operable saw gauge, by means of which, boards, lumber and the like, may be accurately sawed in different lengths as desired. The provision of means for measuring in fractions of an inch without changing the position of the body member 19 also the means for compensating the differences in measurement, depending upon the thicknesses of the saws, are essential features of the invention as they facilitate the sawing of material in various lengths in an accurate, expeditious and reliable manner.

I claim:

1. A saw gauge comprising a graduated bar adapted to extend from one side of a saw along the upper side of a saw table, a plurality of equi-distantly spaced upward projections on said bar, a channel shaped body member adapted to fit over the upper side of the bar, a detent carried by said channel shaped member adapted to extend between any two and engage one of said projections and a member on said channel shaped member against which an edge of material to be sawed is adapted to engage.

2. A saw gauge comprising a graduated bar adapted to extend from one side of a saw along the upper side of a saw table, a plurality of equi-distantly spaced upward projections on said bar, a channel shaped body member adapted to fit over the upper side of the bar, a detent carried by said channel shaped member adapted to extend between any two and engage one of said projections, a member on said channel shaped member against which an edge of material to be sawed is adapted to engage and means of connection between said detent and the channel shaped member providing for longitudinal movement of the channel member relative to said detent to compensate for changes in measurement due to varying thicknesses of saws.

3. A saw gauge comprising a graduated measuring bar adapted to extend along a saw table from one side of the saw, an inverted U-shaped member adapted to fit over the upper side of the bar, an abutment on said member adapted to aline with one of the graduations on the bar and against which one end of the piece of material to be sawed is engaged, a plurality of equi-distantly spaced projections on the bar, a member rotatably mounted upon said U-shaped member and having a portion thereof screw threaded, a screw threaded member receiving said screw threaded portion and a detent on the screw threaded member adapted to engage the projections to hold the U-shaped member and abutment in a predetermined position.

4. A saw gauge comprising a graduated measuring bar adapted to be mounted upon a saw table, a plurality of upward projections on said bar, certain portions of which are equi-distantly spaced in correspondence with the graduations and other portions of which overhang said equi-distantly spaced portions, a member adapted to be mounted upon said bar and a member mounted on the first named member arranged to be disposed opposite one of the graduations and against which an edge of material to be sawed is adapted to engage and a holding member projecting from the first named member so as to engage between the projections and contact with one of said equi-distantly spaced portions of said projections, said overhanging portions being adapted to overlie and retain said holding member in place.

5. A saw gauge comprising a graduated measuring bar adapted to be mounted upon a saw table, a plurality of upward projections on said bar, certain portions of which are equi-distantly spaced in correspondence with the graduations and other portions of which overhang said equi-distantly spaced portions, a member adapted to be mounted upon said bar and a member mounted on the first named member arranged to be disposed opposite one of the graduations and against which an edge of material to be sawed is adapted to engage, a holding member projecting from the first named member so as to engage between the projections and contact with one of said equi-distantly spaced portions of said projections, said overhanging portions being adapted to overlie and retain said holding member in place and means of connection between said holding member and first named member providing for adjustment of the first named member relative to the holding member, to change the position of said abutment member.

6. A saw gauge comprising a graduated measuring bar, a plurality of projections on said bar having portions equi-distantly spaced in correspondence to the graduations and other portions overhanging the equi-distantly spaced portions, a gauge member adapted to be mounted upon the bar, a detent carried by the gauge member adapted to engage one of said equi-distantly spaced portions, said overhanging portions being adapted to engage and retain the detent in place and a member on said gauge member against which an edge of material to be sawed is adapted to engage.

7. A saw gauge comprising a graduated measuring bar, a plurality of projections on said bar having portions equi-distantly spaced in correspondence to the graduations and other portions overhanging the equi-distantly spaced portions, gauge members adapted to be mounted upon the bar, a detent carried by the gauge members adapted to engage one of said equi-distantly spaced portions, said overhanging portions being adapted to engage and retain the detent in place, members on said gauge members against which an edge of material to be sawed is adapted to engage and members mounted on the gauge members so as to be movable into and out of position for engagement with the material to be sawed, each of said members being equal in thickness to a fraction of an inch.

ALLEN H. BLACKBURN.